United States Patent
Sakai et al.

(10) Patent No.: US 7,440,649 B2
(45) Date of Patent: Oct. 21, 2008

(54) WAVELENGTH SELECTIVE SWITCH MODULE

(75) Inventors: Yoshio Sakai, Kawasaki (JP); Kazuyuki Mori, Kawasaki (JP); Satoshi Ide, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 101 days.

(21) Appl. No.: 11/652,041

(22) Filed: Jan. 11, 2007

(65) Prior Publication Data

US 2008/0050065 A1 Feb. 28, 2008

(30) Foreign Application Priority Data

Aug. 28, 2006 (JP) ............... 2006-230974

(51) Int. Cl.
*G02B 6/26* (2006.01)
*G02B 6/42* (2006.01)

(52) U.S. Cl. .................................. 385/18; 385/16

(58) Field of Classification Search ........................ None
See application file for complete search history.

(56) References Cited

U.S. PATENT DOCUMENTS

| | | | |
|---|---|---|---|
| 5,721,796 A * | 2/1998 | de Barros et al. ............. | 385/37 |
| 6,038,357 A * | 3/2000 | Pan .............................. | 385/24 |
| 6,671,464 B1 * | 12/2003 | Kikuchi ...................... | 398/65 |
| 6,678,431 B2 * | 1/2004 | Han et al. .................... | 385/11 |
| 6,714,701 B1 * | 3/2004 | Hazon et al. ................. | 385/18 |
| 6,760,147 B2 * | 7/2004 | Tochio et al. ................ | 359/292 |
| 6,947,623 B2 * | 9/2005 | Ramaswami et al. ......... | 385/16 |
| 7,099,587 B2 * | 8/2006 | Handelman .................. | 398/102 |
| 7,340,126 B2 * | 3/2008 | Mitamura ..................... | 385/18 |
| 2002/0106144 A1 * | 8/2002 | Gaverick et al. ............. | 385/18 |
| 2003/0174928 A1 * | 9/2003 | Huang et al. .................. | 385/18 |
| 2004/0047548 A1 * | 3/2004 | Okumara et al. .............. | 385/18 |
| 2004/0208428 A1 * | 10/2004 | Kikuchi et al. ................ | 385/24 |
| 2005/0213178 A1 | 9/2005 | Sakai et al. | |

FOREIGN PATENT DOCUMENTS

| | | |
|---|---|---|
| JP | 2004-048187 | 2/2004 |
| JP | 2005-195474 | 7/2005 |
| JP | 2005-275094 | 10/2005 |

* cited by examiner

*Primary Examiner*—Sung Pak
*Assistant Examiner*—Chad H Smith
(74) *Attorney, Agent, or Firm*—Staas & Halsey LLP (57) ABSTRACT

A wavelength selective switch module is disclosed. The wavelength selective switch module includes: a unit for generating test light; a multiplexing unit for multiplexing the test light with the wavelength multiplexed light; a splitting unit for splitting the test light from output light of each of two output ports; a feedback control unit for obtaining deflection control amounts for the deflection unit corresponding to a wavelength of the test light such that a light level of the test light that is split from the output light output from each of the two output ports becomes maximum; and a calculation unit for calculating deflection control amounts for output ports other than the two output ports for the deflection unit for the test light and calculating deflection control amounts for output ports for deflection units of wavelengths included in the wavelength multiplexed light using the deflection control amounts for the deflection unit for the test light output from each of the two output ports by which the light level of the test light becomes maximum.

8 Claims, 7 Drawing Sheets

WAVELENGTH SELECTIVE SWITCH MODULE

BACKGROUND OF THE INVENTION

1. Field of the Invention

The present invention relates to a wavelength selective switch module for compensating for characteristic changes of an optical switch due to temperature fluctuation or interannual fluctuation.

2. Description of the Related Art

WDM (Wavelength Division Multiplexing) is known as one of predominant means for constructing a large-capacity optical communications network. In recent years, traffic conveyed by the WDM scheme has been explosively increasing because of the widespread use of the Internet.

An optical cross-connect (OXC) system used in a backbone optical network based on the WDM scheme includes plural optical signal switching apparatuses that are interconnected by optical fibers. When the optical signal switching apparatus receives wavelength-multiplexed optical signals via the optical fiber, the optical signal switching apparatus switches routes of the optical signals for each wavelength, wavelength-multiplexes optical signals of a same route and transmits the multiplexed signal.

By using such optical cross-connect apparatus, when a failure occurs in an optical fiber that forms a communications route, the system can be recovered at high speed by instantaneously diverting traffic of the failed route to a standby optical fiber or to an optical fiber of another route. In addition to that, the optical cross-connect apparatus can edit optical paths for each wavelength.

A MEMS (Micro Electro Mechanical Systems) optical switch performs feedback control such that an optical output level becomes a desired level. When an initial value voltage is changed due to temperature characteristic change or interannual fluctuation, it is necessary to adjust the voltage by performing the feedback control such that inserting loss becomes minimum. Thus, there is a problem in that time required for switching becomes long.

When an optical amplifier is connected after the optical switch, level equalization is performed by using a VOA (Variable Optical Attenuation) function of the optical switch such that optical level of each wavelength input into the optical amplifier becomes the same. However, when the initial value voltage is changed, the VOA function does not work correctly, so that there is a case in which an optical level for a wavelength increases too much so that an optical surge occurs.

As described in Japanese Laid-Open Patent Application No. 2004-48187 (Patent document 1), in an optical switch using conventional MEMS, light sources are connected to every input port via a coupler, and feedback control is performed such that output level of the optical switch becomes a desired level to correct the deviation of the initial value voltage.

Japanese Laid-Open Patent Application No.2005-275094 (Patent document 2) discloses an optical switch including a control unit for changing an output optical level detected by an optical detection unit to a desired level.

Japanese Laid-Open Patent Application No.2005-195474 (Patent document 3) discloses an optical switch for compensating for wavelength deviation of calibration light based on calibration light wavelength error and calibration light output.

By using the conventional technique disclosed in the patent document 1, the deviation of the initial value voltage due to temperature characteristics or interannual variability of the MEMS optical switch can be corrected. But, since it is necessary to test all paths, it is difficult to increase speed for correcting the initial value voltage. In addition, since test light sources the number of which is the same as the number of the channels are necessary, there is a problem in that cost reduction and size reduction for the apparatus is difficult.

An object of the present invention is to provide a wavelength selective switch module that can reduce time for correcting the initial value voltage and that can realize cost reduction and size reduction, and that requires only one test light source.

SUMMARY OF THE INVENTION

The object is achieved by a wavelength selective switch module for splitting wavelength multiplexed light for each wavelength, supplying each wavelength light into a deflection unit, and outputting each wavelength light to one of a plurality of output ports by setting a deflection control amount for the deflection unit, the wavelength selective switch module including:

a test light generation unit configured to generate test light;

a multiplexing unit configured to multiplex the test light with the wavelength multiplexed light;

a splitting unit configured to split the test light from output light of each of two output ports of the plurality of output ports;

a feedback control unit configured to perform feedback control for obtaining deflection control amounts for the deflection unit corresponding to a wavelength of the test light such that a light level of the test light that is split from the output light output from each of the two output ports becomes maximum; and a deflection control amount calculation unit configured to calculate deflection control amounts for output ports other than the two output ports for the deflection unit for the wavelength of the test light and calculate deflection control amounts for output ports for deflection units of wavelengths included in the wavelength multiplexed light using the deflection control amounts for the deflection unit for the wavelength of the test light output from each of the two output ports by which the light level of the test light becomes maximum.

According to the present invention, time for correcting the initial value voltage can be decreased, and only one test light source is necessary, and cost reduction and size reduction for the apparatus can be realized.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

In the following, embodiments of the present invention are described with reference to figures.

<Configuration of Wavelength Selective Switch Module>

Figure 1:
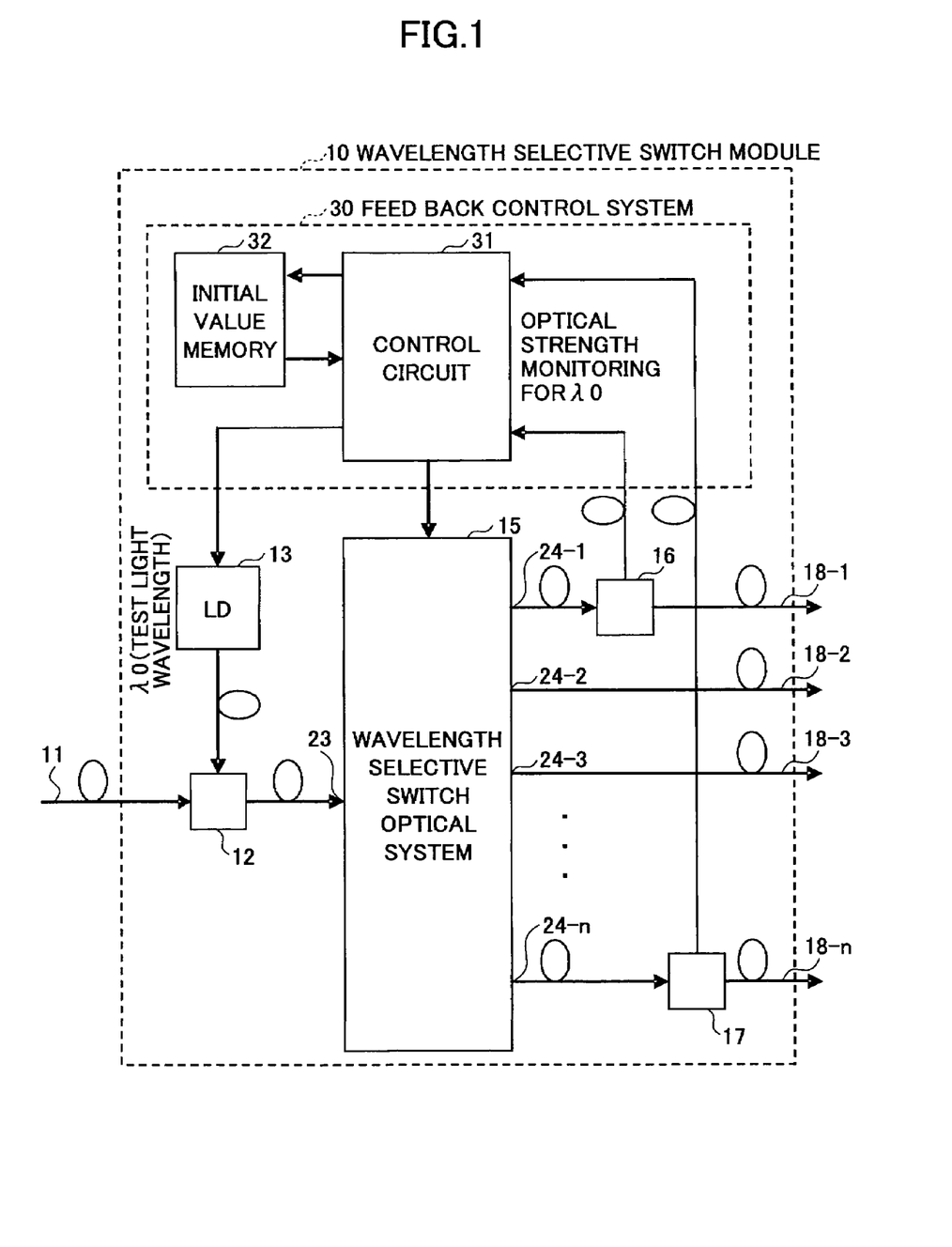
FIG. 1 shows a block diagram of a wavelength selective switch module of an embodiment of the present invention.

FIG. 1 shows a block diagram of the wavelength selective switch module of an embodiment of the present invention. The wavelength selective module performs desired switching for each wavelength of an input optical signal so as to selectively output an arbitrary wavelength signal to a desired output port.

As shown in the figure, the wavelength selective module 10 receives a wavelength multiplexed optical signal in which wavelengths λ1~λm are multiplexed from an optical fiber 11. The wavelength multiplexed optical signal is supplied to a wavelength filter 12. The wavelength filter 12 is also supplied with test light of wavelength λ0 that is generated by a laser diode 13 that is a test light source, and the wavelength filter 12 multiplexes the wavelength multiplexed light and the test light to provide multiplexed light to a wavelength selective switch optical system 15.

Figure 2:
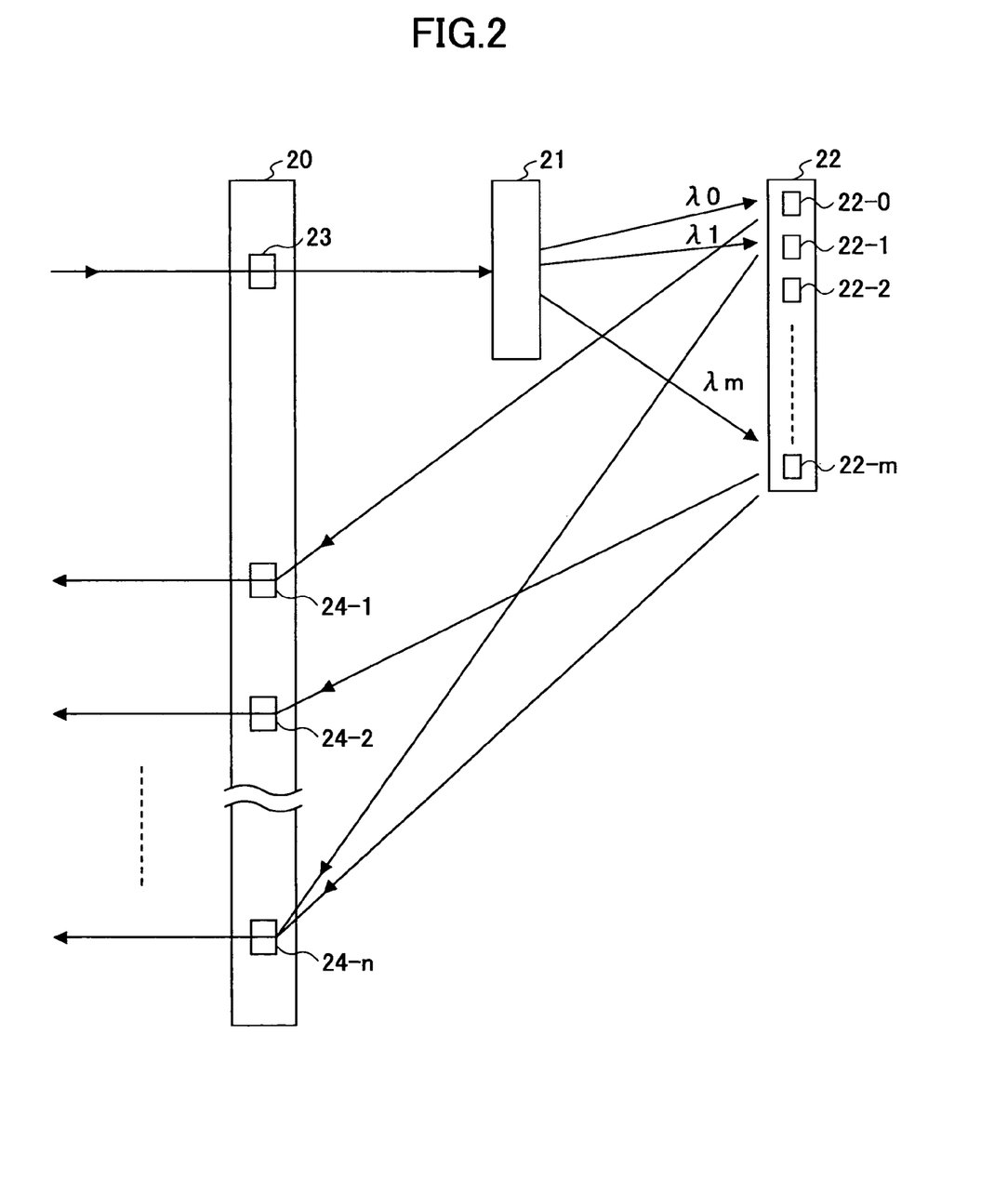
FIG. 2 shows a block diagram of a wavelength selective switch optical module of an embodiment of the present invention.

As shown in FIG. 2, the wavelength selective switch optical system 15 includes a lens array 20, a diffraction grating 21 and a MEMS unit 22. The lens array 20 as a supporting member includes a lens of an input port 23 and lenses of output ports 24-1-24-n that are arranged in a line.

The wavelength multiplexed light entered into the input port 23 of the lens array 20 is supplied to the diffraction grating 21 so that the wavelength multiplexed light is divided into each wavelength light. After that, the test light of wavelength λ0 enters into a MEMS mirror 22-0 of the MEMS unit 22, and signal lights of wavelengths λ1~λm enter into MEMS mirrors 22-1-22-m respectively.

Each of the MEMS mirrors 22-0-22-m as a deflection unit of the MEMS unit 22 is driven based on control by the control circuit 31 shown in FIG. 1. The MEMS mirror 22-0 deflects and reflects the entered test light of the wavelength λ0 to either one of the output ports 24-1 and 24-n of the lens array 20 (or a light termination unit other than the lens array 20). The MEMS mirrors 22-1-22-m deflect and reflect the entered signal lights of wavelengths λ1~λm respectively to any one of the output ports 24-1-24-n of the lens array 20 (or light termination unit other than the lens array 20).

Each of the output ports 24-1-24-n outputs signal light of a wavelength of wavelengths λ1-λm entered from the MEMS unit 22. By the way, each of the output ports 24-1 and 24-n multiplexes test light of wavelength λ0 with the signal light of one of wavelengths λ1-λm.

As shown in FIG. 1, the output ports 24-1 and 24-n of the wavelength selective switch optical system 15 supply light to the wavelength filters 16 and 17 respectively. Each of the wavelength filters 16 and 17 splits the light into the wavelength λ0 and a wavelength of the wavelengths λ1-λm, and provides the test light of the wavelength λ0 to the control circuit 31 of the feedback control system 30, and outputs the signal light of the wavelength of the wavelengths λ1-λm to an optical fiber of the optical fibers 18-1-18-n. Output ports 24-2-24-(n−1) of the wavelength selective switch optical system 15 output light to the optical fibers 18-2-18-(n−1) respectively.

The control circuit 31 includes a photodiode for outputting an electric signal (photo current:current signal) according to an optical strength level of the test signal for example, and a light detection unit including a current/voltage converter for converting the photo current into a voltage signal and outputting the voltage signal.

The control circuit 31 controls deflection status of each of the MEMS mirrors 22-0-22-m of the MEMS unit 22 based on a detection result of the optical detection unit and an initial value voltage of each MEMS mirror stored in the initial value memory 32. The control circuit 31 is realized by ASIC (Application Specific Integrated Circuit) such as FPGA (Field Programmable Gate Arrays), for example.

<Distribution of Light Output Level>

Figure 3:
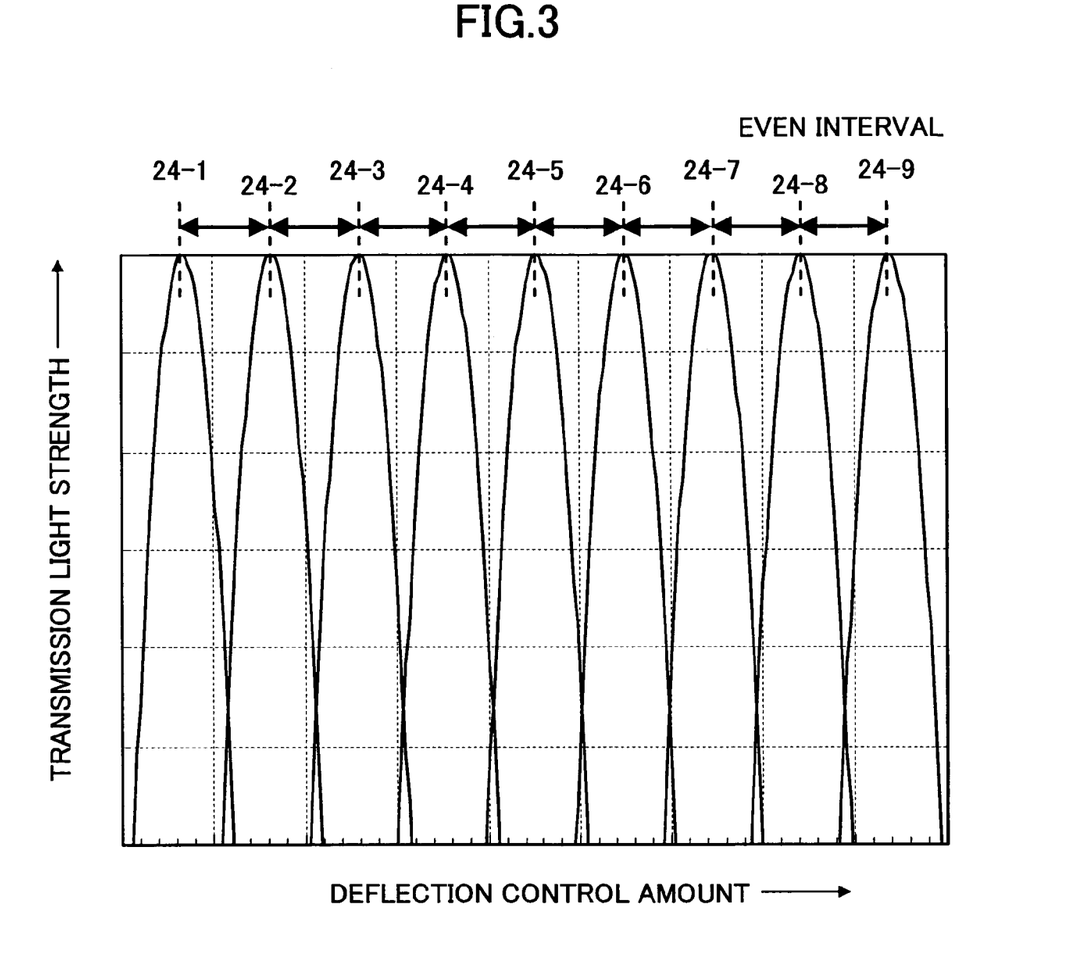
FIG. 3 shows relationship between deflection control amount and transmission light strength.

Each of the MEMS mirrors 22-0-22-m in the wavelength selective switch optical system 15 has an axis for rotating entering light in a direction of arrangement of the output ports 24-1-24-n. As an example, FIG. 3 shows relationship between deflection control amount (angle) in the direction of the arrangement of the output ports for the MEMS mirror 22-0 and transmission light strength (optical output level) for each of the output ports 24-1-24-n. As shown in FIG. 3, values of deflection control amount at which the transmission light strength becomes maximum (insertion loss is the minimum) are spaced at regular intervals for the output ports 24-1-24-n.

Since this relationship holds true for each of the MEMS mirrors 22-0-22-m, by measuring a deflection control amount necessary for outputting light to a desired output port using the test light of the wavelength λ0, each deflection control amount for other wavelengths can be obtained.

Figure 4:
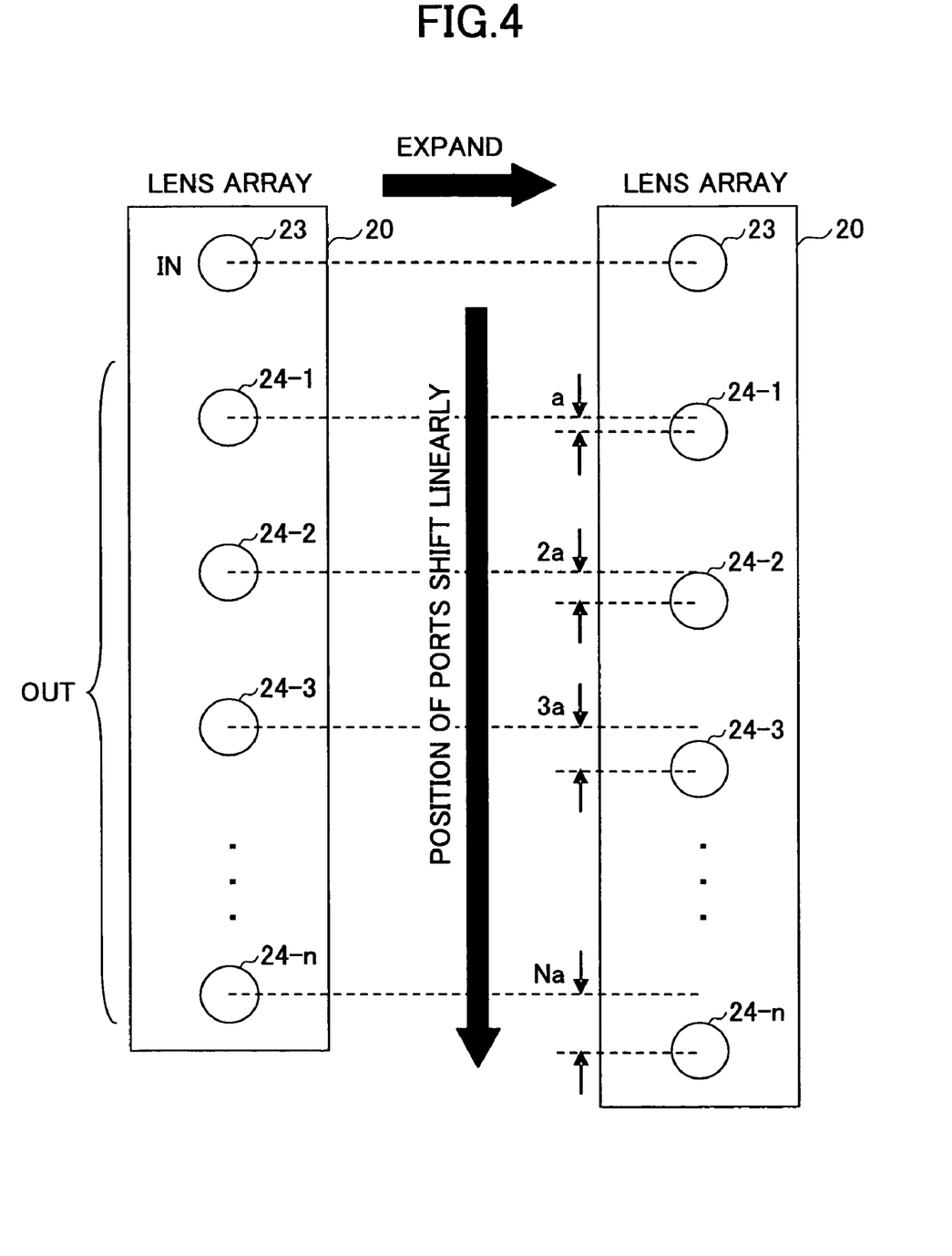
FIG. 4 is a figure for explaining shifts of the deflection control amount.

As shown in FIG. 4, the input port 23 and the output ports 24-1-24-n are provided at the same intervals on the lens array 20 that is a supporting member. Deviation of the deflection control amount occurs due to linear expansion and contraction of the lens array 20. Thus, the deviation amount of each of the output ports 24-2-24-n with respect to the input port 23 is proportional to a deviation amount "a" of the output port 24-1. Therefore, by measuring deflection control amounts at which transmission light strength of the output ports 24-1 and 24-n that are both ends become maximum by using the deflection unit (MEMS mirror 22-0) corresponding to the test light of the wavelength λ0, deflection control amounts of each of the output ports 24-2-24-(n−1) existing between them can be obtained by performing interpolation calculation.

Figure 5:
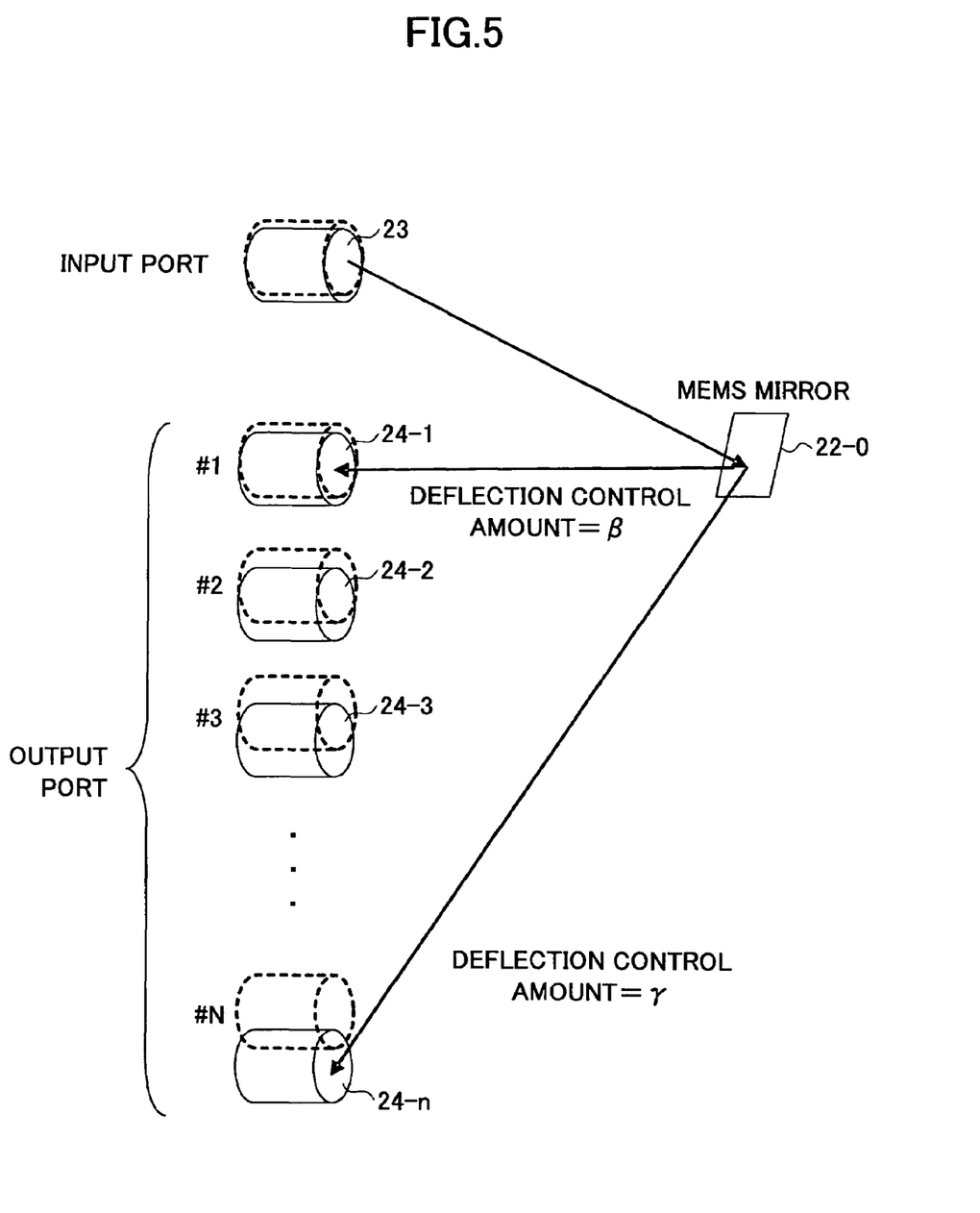
FIG. 5 is a figure for explaining interpolation calculation of the deflection control amount $\theta p$ of the output port p.

In FIG. 5, initial positions of the input port 23 and the output ports 24-1-24-n are shown by dotted lines, and status after receiving interannual variation or temperature variation is shown by solid lines. For example, in the changed state, assuming that β is a deflection control amount for outputting the test light of the wavelength λ0 to the output port 24-1, and γ is a deflection control amount for outputting the test light of the wavelength λ0 to the output port 24-n, and assuming that p is a number of an output port between the output ports 24-1 and 24-n, a deflection control amount θp necessary for outputting the light signal to an output port p is calculated by the following equation (1).

$$\theta p = \beta + (\gamma - \beta) \cdot (p-1)/(n-1) \qquad (1)$$

By the way, ports at which the amount is measured are not necessarily the ports of the both ends, but they can be arbitrary two ports. As to interoperation calculation, other than the linear approximation like the equation (1), various methods such as polynomial approximation can be used. By using the equation (1), when the number of the output ports is n, measurement is performed only for two ports and the interoperation calculation is performed for other ports. Therefore, compared with a case where all ports are measured, the correction time of the deflection control amount can be reduced to (2/n).

Accordingly, by measuring the deflection control amount for the MEMS mirror 22-0 corresponding to the test light, deflection control amounts (angles) can be calculated for all MEMS mirrors 22-0-22-m.

Relationship between a control voltage V of each MEMS mirror 22-0-22-m and the deflection control amount θ, that is V-θ characteristics, is provided by the following equation (2).

$$\theta = \alpha_i V^2 \quad (2)$$

In the equation, i indicates a MEMS mirror number and $\alpha_i$ indicates a coefficient which is different for each of MEMS mirrors 22-0-22-m. The coefficients for the mirrors are known and are stored in the initial value memory 32 beforehand.

A control voltage V for θp of MEMS mirrors 22-0-22-m can be obtained according to the coefficient $\alpha_i$ in the equation (2).

<Control Method>

Figure 6:
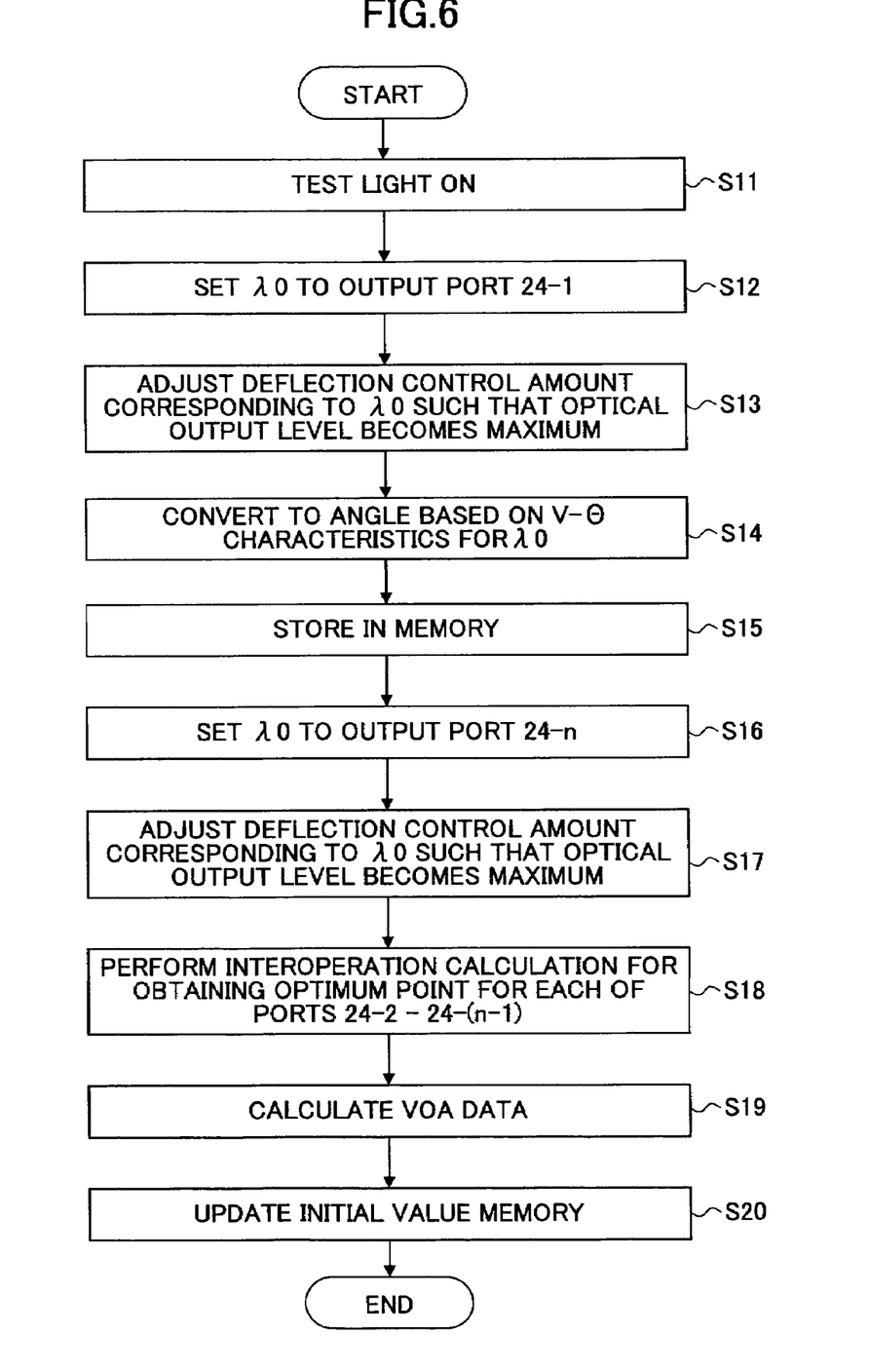
FIG. 6 shows a flowchart for performing test control.

FIG. 6 shows a flowchart for performing test control by the control circuit 31. In this example, test ports are the output ports 24-1 and 24-n of the both ends.

In step S1, the control circuit 31 causes the laser diode 13 of the test light source to emit light. In step S12, the control circuit 31 sets an output port of the MEMS mirror 22-0 corresponding to the test light of the wavelength λ0 to be the output port 24-1 in step S12. At this time, an initial value voltage to be set is read from the initial value memory 32. After that, in step S13, the control circuit 31 performs aftermentioned feedback control to measure the initial value voltage (optimum point) in which the optical output level becomes maximum.

Since V-θ characteristics for each of MEMS mirrors 22-0-22-m are different each other, the measured optimum point voltage is converted to angle information β based on V-θ characteristics for the MEMS mirror 22-0 corresponding to the test light in step S14, and the initial value voltage (optimum point) and the angle information β are stored in an internal memory in the control circuit 31 in step S15.

After that, the output port of the MEMS mirror 22-0 corresponding to the wavelength λ0 is set to be the output port 24-n in step S16. Then, feedback control is performed in step S17 so as to measure an initial value voltage (optimum point) in which the optical output level becomes maximum.

Then, in step S18, the control circuit 31 converts the measured initial value voltage (optimal point) into angle information γ based on V-θ characteristics of the MEMS mirror 22-0 corresponding to the test light. Next, the control circuit 31 calculates each deflection control amount θp necessary for outputting the light signal to other output port p (p=24-1-24-n) based on the equation (1), and calculates each initial value voltage corresponding to θp using the equation (2). In addition, the control circuit 31 obtains each initial value voltage corresponding to θp for each of the MEMS mirrors 22-1-22-m based on V-θ characteristics of each of the MEMS mirrors 22-1-22-m corresponding to wavelengths λ1-λm.

As to VOA data for performing level equalization such that output light level becomes the same for each wavelength, since the deflection control amount from an optimal point for obtaining desired output light level is known from the relationship between the deflection control amount and the transmission light strength shown in FIG. 3, the control circuit 31 calculates the initial value voltage such that the output light level becomes the same for each wavelength based on information of the deflection control amount from the optimal point and V-θ characteristics of the MEMS mirror corresponding to each wavelength in step S19.

Next, the control circuit 31 stores the initial value voltages corresponding to each θp for each of the MEMS mirrors into the initial value memory 32 to update the memory and end the process.

<Feedback Control>

Figure 7:
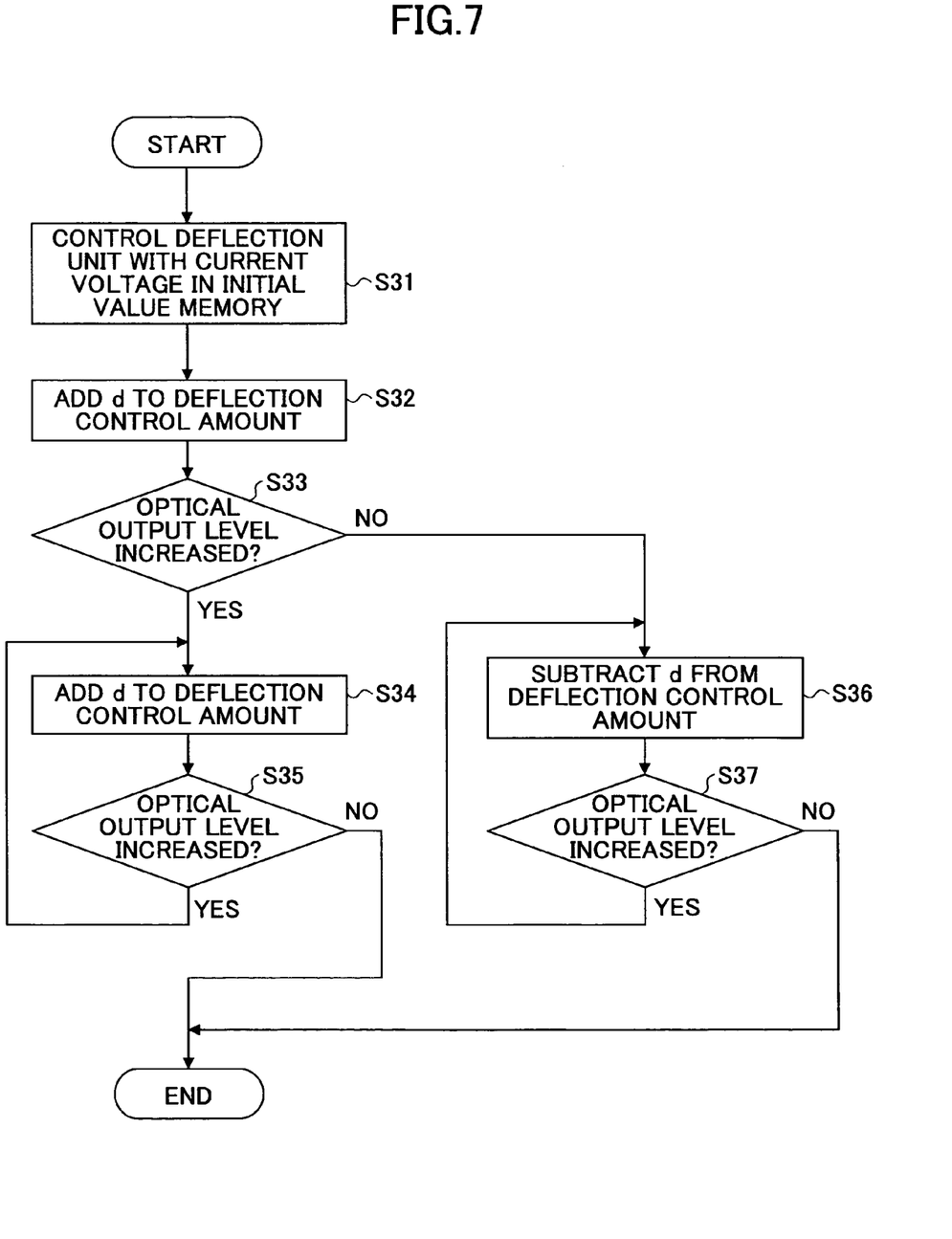
FIG. 7 shows a flowchart of feedback control.

FIG. 7 shows a flowchart of the feedback control performed by the control circuit 31. In the figure, the control circuit 31 reads the initial value voltage of the output port 24-0 (or 24-n) of the MEMS mirror 22-0 from the initial value memory 32 in step S31 so as to drive the MEMS mirror 22-0 of the wavelength selective switch optical system 15.

Next, in step S32, the deflection control amount (angle) is increased by a minute amount "d" so as to drive the MEMS mirror 22-0. Then, the control circuit 31 determines whether the detection level of the wavelength λ0 supplied from the wavelength filter 16 (or 17) increases in step S33.

If the detection level increases, the control circuit 31 further increases the deflection control amount by the minute amount "d" so as to drive the MEMS mirror 22-0 in step S34. In step S35, the control circuit 31 determines whether the detection level of the wavelength λ0 supplied from the wavelength filter 16 (or 17) increases. When the detection level increases, the process goes to the step S34, and the steps S34 and S35 are repeated. When the detection level does not increase, the process ends.

On the other hand, when the detection level does not increase, the control circuit 31 decreases the deflection control amount by the minute amount "d" so as to drive the MEMS mirror 22-0 in step S36. In step S37, the control circuit 31 determines whether the detection level of the wavelength λ0 supplied from the wavelength filter 16 (or 17) increases. When the detection level increases, the process goes to the step S36, and the steps S34 and S35 are repeated. When the detection level does not increase, the process ends.

As mentioned above, according to this embodiment, since a voltage by which the transmission light strength becomes maximum is measured for each of the both end output ports 24-1 and 24-n, and voltages for output ports between them are obtained by interpolation calculation, it becomes possible to shorten updating time for deflection control amount. In addition, since only one light source for the test light is necessary, it becomes possible to reduce cost and size of the wavelength selective switch module.

By the way, the relationship shown in FIG. 3 holds true for all MEMS mirrors. Therefore, the relationship shown in FIG. 3 including VOA data may be measured by providing an output port for testing so that the initial value voltage of the MEMS mirrors corresponding to other wavelengths can be calculated from the deflection control amount information. In addition, as the interpolation formula, any kinds can be used such as linear approximation, polynomial approximation and the like. In addition, as to the output ports for test, arbitrary two ports can be selected.

As mentioned above, according to an embodiment of the present invention, a wavelength selective switch module for splitting wavelength multiplexed light for each wavelength, supplying each wavelength light into a deflection unit, and outputting each wavelength light to one of a plurality of output ports by setting a deflection control amount for the deflection unit is obtained. The wavelength selective switch module includes: a test light generation unit configured to generate test light; a multiplexing unit configured to multiplex the test light with the wavelength multiplexed light; a splitting unit configured to split the test light from output light of each of two output ports of the plurality of output ports; a feedback control unit configured to perform feedback control for obtaining deflection control amounts for the deflection unit corresponding to a wavelength of the test light such that a light level of the test light that is split from the output light output from each of the two output ports becomes maximum; and a deflection control amount calculation unit configured to calculate deflection control amounts for output ports other than the two output ports for the deflection unit for the wavelength of the test light and calculate deflection control amounts for output ports for deflection units of wavelengths included in the wavelength multiplexed light using the deflection control amounts for the deflection unit for the wavelength of the test light output from each of the two output ports by which the light level of the test light becomes maximum.

In the wavelength selective switch module, the test light generation unit generates the test light of a wavelength that is different from each wavelength included in the wavelength multiplexed light. The deflection control amount calculation unit obtains the deflection control amounts for the output ports for the deflection unit for the wavelength of the test light by linear interpolation using the deflection control amounts for the deflection unit for the wavelength of the test light output from the two output ports by which the light level of the test light becomes maximum.

In the wavelength selective switch module, the plurality of output ports are arranged in a line on a supporting member, and the two output ports are output ports of both ends of the plurality of output ports. In the wavelength selective switch module, when the deflection control amounts for the deflection unit for the wavelength of the test light in which optical level of the test light becomes maximum for the two output ports are $\beta$ and $\gamma$ respectively, and a number of the output ports is n, and when an output port number is p, the deflection control amount calculation unit calculates $\theta p = \beta + (\gamma - \beta) \cdot (p-1)/(n-1)$ as the deflection control amount of an output port of the plurality of output ports for the deflection unit for the wavelength of the test light.

In the wavelength selective switch module, the deflection control amount calculation unit calculates each of the deflection control amounts for the output ports for the deflection units for the wavelengths included in the wavelength multiplexed light using a control voltage corresponding to $\theta p$ and a coefficient set to each of the deflection units.

In addition, in the wavelength selective switch module, the deflection control amount calculation unit performs level equalization such that light levels of each wavelength in the plurality of output ports become the same, and calculates the deflection control amounts for the output ports for the deflection units for the wavelengths included in the wavelength multiplexed light.

The present invention is not limited to the specifically disclosed embodiments, and variations and modifications may be made without departing from the scope of the present invention.

The present application contains subject matter related to Japanese patent application No. 2006-230974, filed in the JPO on Aug. 28, 2006, the entire contents of which are incorporated herein by reference.

What is claimed is:

1. A wavelength selective switch module for splitting wavelength multiplexed light for each wavelength, supplying each wavelength light into a deflection unit, and outputting each wavelength light to one of a plurality of output ports by setting a deflection control amount for the deflection unit, the wavelength selective switch module comprising:
   a test light generation unit configured to generate test light;
   a multiplexing unit configured to multiplex the test light with the wavelength multiplexed light;
   a splitting unit configured to split the test light from output light of each of two output ports of the plurality of output ports;
   a feedback control unit configured to perform feedback control for obtaining deflection control amounts for the deflection unit corresponding to a wavelength of the test light such that a light level of the test light that is split from the output light output from each of the two output ports becomes maximum; and
   a deflection control amount calculation unit configured to calculate deflection control amounts for output ports other than the two output ports for the deflection unit for the wavelength of the test light and calculate deflection control amounts for output ports for deflection units of wavelengths included in the wavelength multiplexed light using the deflection control amounts for the deflection unit for the wavelength of the test light output from each of the two output ports by which the light level of the test light becomes maximum.

2. The wavelength selective switch module as claimed in claim 1, wherein the test light generation unit generates the test light of a wavelength that is different from each wavelength included in the wavelength multiplexed light.

3. The wavelength selective switch module as claimed in claim 1, wherein the deflection control amount calculation unit obtains the deflection control amounts for the output ports for the deflection unit for the wavelength of the test light by linear interpolation using the deflection control amounts for the deflection unit for the wavelength of the test light output from the two output ports by which the light level of the test light becomes maximum.

4. The wavelength selective switch module as claimed in claim 3, wherein the plurality of output ports are arranged in a line on a supporting member, and the two output ports are output ports of both ends of the plurality of output ports.

5. The wavelength selective switch module as claimed in claim 4, wherein, when the deflection control amounts for the deflection unit for the wavelength of the test light in which optical level of the test light becomes maximum for the two output ports are $\beta$ and $\gamma$ respectively, and a number of the output ports is n, and when an output port number is p, the deflection control amount calculation unit calculates $\theta p = \beta + (\gamma - \beta) \cdot (p-1)/(n-1)$ as the deflection control amount of an output port of the plurality of output ports for the deflection unit for the wavelength of the test light.

6. The wavelength selective switch module as claimed in claim 5, wherein the deflection control amount calculation unit calculates each of the deflection control amounts for the output ports for the deflection units for the wavelengths included in the wavelength multiplexed light using a control voltage corresponding to $\theta p$ and a coefficient set to each of the deflection units.

7. The wavelength selective switch module as claimed in claim 1, wherein the deflection control amount calculation unit performs level equalization such that light levels of each wavelength in the plurality of output ports become the same, and calculates the deflection control amounts for the output ports for the deflection units for the wavelengths included in the wavelength multiplexed light.

8. The wavelength selective switch module as claimed in claim 1, wherein the deflection unit is a MEMS mirror.

* * * * *